UNITED STATES PATENT OFFICE.

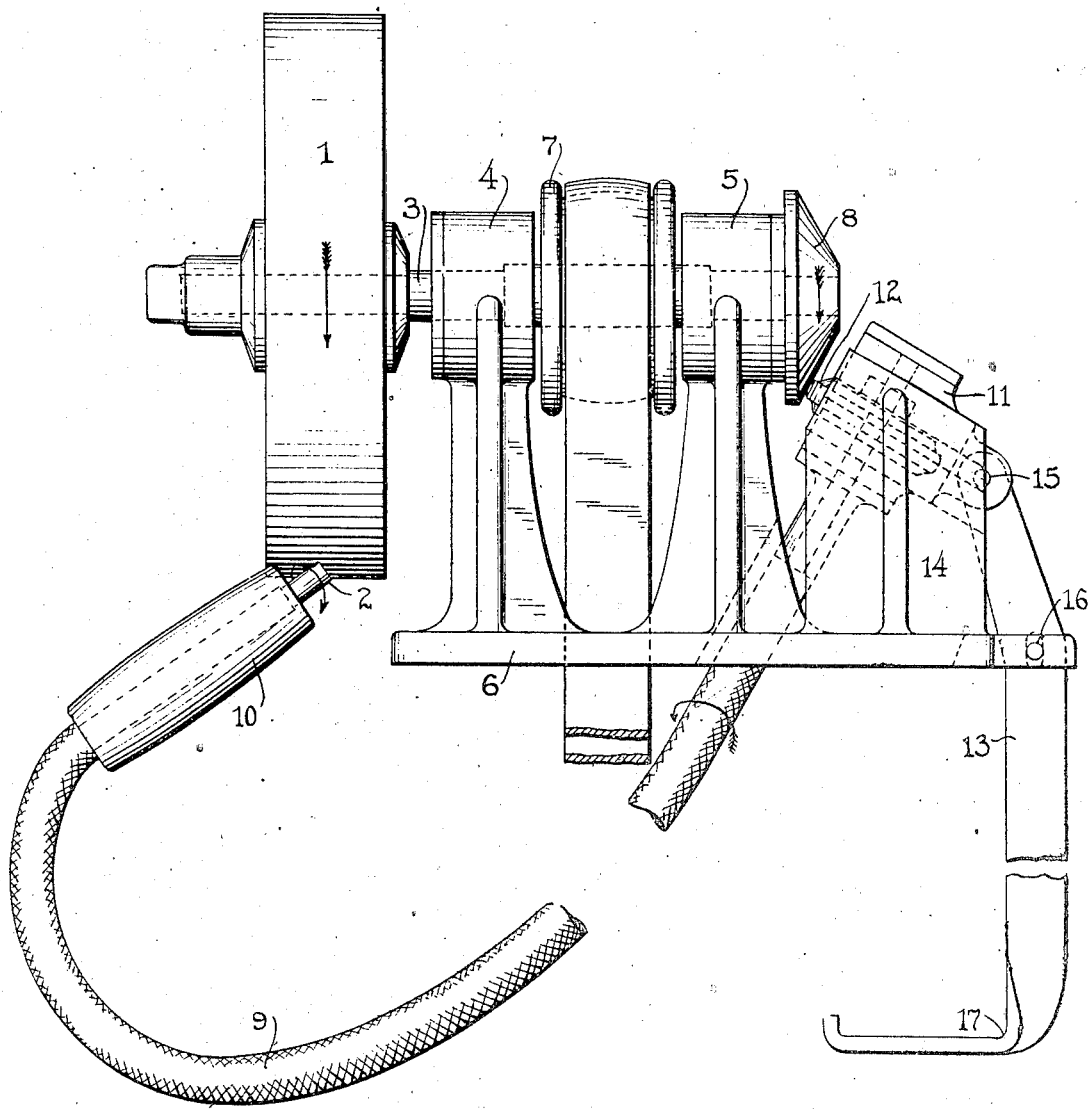

FRANK BOLLER, OF MILWAUKEE, WISCONSIN, ASSIGNOR TO THE CUTLER-HAMMER MFG. CO., OF MILWAUKEE, WISCONSIN, A CORPORATION OF WISCONSIN.

BUFFING-MACHINE.

1,324,224. Specification of Letters Patent. Patented Dec. 9, 1919.

Application filed April 7, 1917. Serial No. 160,375.

*To all whom it may concern:*

Be it known that I, FRANK BOLLER, a citizen of the United States, residing at Milwaukee, in the county of Milwaukee and State of Wisconsin, have invented new and useful Improvements in Buffing-Machines, of which the following is a full, clear, concise, and exact description, reference being had to the accompanying drawing, forming a part of this specification.

This invention relates to buffing machines.

In buffing various articles, especially those presenting curved or irregular surfaces, it has been found desirable and expedient to manually hold the same against the buffing wheel but such manual retention of the work has been found quite difficult in many instances. Where a wheel of high velocity is employed it is difficult to hold the work against displacement, while on the other hand, a reduction in the velocity of the wheel requires an augmented pressure on the work to obtain the desired buffing action.

An object of this invention is to provide a machine for the aforesaid and other purposes, in the operation of which the work may be more readily manipulated and maintained in suitable relation with the buffing wheel.

A further object is to provide a machine of the character stated, wherein the peripheral speed of the buffing wheel is materially reduced while maintaining a high speed ratio between engaging portions of the wheel and the work, whereby the necessary force of application therebetween is materially reduced.

Other objects and advantages will hereinafter appear.

The accompanying drawing, which is a side elevational view of the preferred embodiment of the invention, will now be described, it being understood that the invention is capable of embodiment in various other forms.

Referring to the drawing, the machine illustrated comprises in general a buffing wheel 1, a work bearing spindle 2 and connections for driving said wheel and said spindle in the same direction, whereby the engaging portions of the wheel and the work are driven in opposite directions.

The buffing wheel 1 is secured upon a shaft 3 for rotation therewith, the latter being mounted within bearings 4, 5 upon a base 6 and carrying a belt pulley 7 and a beveled friction driving pulley 8. The spindle 2 is secured upon the end of a flexible shaft 9 whereby the work may be held in suitable relation with the buffing wheel 1 by means of a non-rotative handle 10 carried by said shaft. The opposite end of the flexible shaft is carried within a slidable bearing member 11 and has a friction wheel 12 secured thereto, said bearing member being operable through a foot lever 13 for moving the wheel 12 into and out of driving engagement with the beveled friction wheel 8, whereby motion is transmitted to the work at the will of the operator.

The bearing member 11 is recessed to partially surround the friction wheel 12 and is slidably mounted within guides 14, which are preferably constructed integral with the base 6, said bearing member and guides being provided with coöperating grooves and flanges for preventing relative rotation thereof. Said guides are, furthermore, so arranged that said bearing member is slidable in a direction at right angles to the beveled face of the friction wheel 8 for insuring proper positioning of the wheel 12 with respect thereto.

The upper end of the lever 13 is pivotally secured at 15 to said bearing member, said lever being pivotally secured intermediate its ends to the base 6 by means of a lost motion connection 16. The lower end of said lever is inturned at 17 whereby the same may be foot operated.

The shaft 9 is reflexed in the manner illustrated, and the aforesaid connections are such that, during operation of the machine, the buffing wheel and the work are driven in the same direction, whereby their engaging surfaces travel in opposite directions and the effective speeds thereof are rendered cumulative.

By the above arrangement it is obvious that the buffing wheel may be rotated at a relatively low speed, thus facilitating the maintaining of the work in contact therewith, and reducing friction in the machine. Also, owing to the high relative speed of the engaging surfaces, the force and duration of application of the work to the wheel may be greatly reduced, a touch of the former against the latter being often sufficient.

The aforedescribed mechanism while capable of general application, has been found particularly advantageous when applied to the finishing of articles composed of molded electric insulation material.

What I claim as new and desire to secure by Letters Patent is:

1. In a buffing machine, in combination, a rotatable buffing wheel, a manually positioned work carrying spindle and a driving connection for said spindle operative for rotation thereof in the same direction as that of said buffing wheel for causing the engaging surfaces of said wheel and the work to travel cumulatively in opposite directions.

2. In a buffing machine, the combination with a rotatable buffing wheel and driving means therefor, of a manually positioned work carrying spindle, and means operative for rotating said spindle to cause cumulative travel of the engaging surfaces of said wheel and the work, while permitting unrestricted manual positioning of the work through movement of said spindle.

3. In a buffing machine, the combination with a movable buffing surface and means for causing continuous movement thereof at a relatively low speed, of a work carrying spindle, said spindle being manually freely movable for positioning the work carried thereby, and means providing a relatively high travel velocity ratio between engaging surfaces of the wheel and the work.

4. In a buffing machine, in combination, a buffing surface, a manually positionable and freely movable work carrying spindle, means for moving said buffing surface at a low speed for facilitating positioning of the work thereon by means of said spindle, and means operated by the driving means of said buffing surface for providing a high rate of relative travel in opposite directions between said surface and the work at the point of engagement thereof.

5. In a buffing machine, in combination, a buffing surface, a manually positionable work carrying spindle, means for moving said buffing surface at a low speed for facilitating positioning of the work thereon by means of said spindle, means operated by the driving means of said buffing surface for providing a high rate of relative travel in opposite directions between said surface and the work at the point of engagement thereof, and means for rendering said last named means operative or inoperative at will.

6. In a buffing machine, in combination, a buffing wheel mounted upon a shaft for rotation therewith, driving means for said shaft, a manipulable work carrying spindle associated with said wheel, and driving means for said spindle including a friction wheel mounted on said shaft, a second friction wheel mounted for driving engagement with said friction wheel, and a flexible shaft connecting said spindle and said second mentioned friction wheel, said flexible shaft being reflexed to insure rotation of said spindle in the same direction as that of said buffing wheel.

7. In a buffing machine, in combination, a buffing wheel mounted upon a shaft for rotation therewith, driving means for said shaft, a manipulable work carrying spindle associated with said wheel, and driving means for said spindle including a friction wheel mounted on said shaft, a second friction wheel mounted for driving engagement with said friction wheel, a flexible shaft connecting said spindle and said second mentioned friction wheel, said flexible shaft being reflexed to insure rotation of said spindle in the same direction as that of said buffing wheel, and means for interrupting or restoring the engagement of said friction wheels at will.

In witness whereof I have hereunto subscribed my name.

FRANK BOLLER.